(12) United States Patent
Baldanzini et al.

(10) Patent No.: US 10,724,531 B2
(45) Date of Patent: Jul. 28, 2020

(54) METHOD AND APPARATUS FOR COMPRESSOR SYSTEM PRESSURIZATION

(71) Applicant: Nuovo Pignone Tecnologie SRL, Florence (IT)

(72) Inventors: Fabio Baldanzini, Florence (IT); Lorenzo Gallinelli, Florence (IT)

(73) Assignee: Nuovo Pignone Tecnologies SRL, Florence (IT)

( * ) Notice: Subject to any disclaimer, the term of this patent is extended or adjusted under 35 U.S.C. 154(b) by 151 days.

(21) Appl. No.: 15/572,204

(22) PCT Filed: May 6, 2016

(86) PCT No.: PCT/EP2016/060181
§ 371 (c)(1),
(2) Date: Nov. 7, 2017

(87) PCT Pub. No.: WO2016/177879
PCT Pub. Date: Nov. 10, 2016

(65) Prior Publication Data
US 2018/0106260 A1   Apr. 19, 2018

(30) Foreign Application Priority Data

May 7, 2015   (IT) .............................. MI2015A0646

(51) Int. Cl.
*F04D 27/02*   (2006.01)
*F04D 27/00*   (2006.01)
(Continued)

(52) U.S. Cl.
CPC ............ *F04D 27/0207* (2013.01); *F02C 6/08* (2013.01); *F02C 9/18* (2013.01); *F04D 25/16* (2013.01);
(Continued)

(58) Field of Classification Search
CPC .......... F04D 17/12; F04D 19/02; F04D 25/16; F04D 27/02; F04D 27/0207;
(Continued)

(56) References Cited

U.S. PATENT DOCUMENTS 8,821,132 B2 * 9/2014 Fejzuli .................... B63J 99/00
417/266
2003/0113214 A1   6/2003 Kharsa
(Continued)

FOREIGN PATENT DOCUMENTS

CN     1461387 A    12/2003
CN   103122844 A     5/2013
(Continued)

OTHER PUBLICATIONS

Search Report and Written Opinion issued in connection with corresponding IT Application No. MI2015A000646 dated Jan. 12, 2016.
(Continued)

*Primary Examiner* — Peter J Bertheaud
(74) *Attorney, Agent, or Firm* — Baker Hughes Patent Organization

(57) ABSTRACT

A method of pressurizing a downstream compressor system operatively connected to an upstream compressor system by using a bleeding line connected at a first end to the downstream compressor system and at a second end at least to one bleeding region or tie-out region of the upstream compressor system.

2 Claims, 3 Drawing Sheets

(51) Int. Cl.
*F02C 9/18* (2006.01)
*F02C 6/08* (2006.01)
*F04D 25/16* (2006.01)
*F04B 25/00* (2006.01)
*F04D 17/12* (2006.01)
*F04D 19/02* (2006.01)
*F04B 41/06* (2006.01)

(52) U.S. Cl.
CPC ........... *F04D 27/009* (2013.01); *F04D 27/02* (2013.01); *F04D 27/0215* (2013.01); *F04D 27/0269* (2013.01); *F04B 25/00* (2013.01); *F04B 41/06* (2013.01); *F04D 17/12* (2013.01); *F04D 19/02* (2013.01)

(58) Field of Classification Search
CPC ............. F04D 27/0215; F04D 27/0223; F04D 27/0269; F04D 27/009; F02C 9/18; F02C 6/06; F02C 6/08; F04B 25/00; F04B 41/06
USPC .................................................. 417/250–253
See application file for complete search history.

(56) References Cited

U.S. PATENT DOCUMENTS

| | | |
|---|---|---|
| 2003/0161731 A1 | 8/2003 | Blotenberg |
| 2011/0103976 A1 | 5/2011 | Fejzuli |
| 2011/0130883 A1 | 6/2011 | Van Dijk |

FOREIGN PATENT DOCUMENTS

| | | |
|---|---|---|
| CN | 203035481 U | 7/2013 |
| JP | 5746088 A | 3/1982 |
| WO | 99/49222 A1 | 9/1999 |

OTHER PUBLICATIONS

International Search Report and Written Opinion issued in connection with corresponding PCT Application No. PCT/EP2016/060181 dated Jun. 10, 2016.

International Preliminary Report on Patentability issued in connection with corresponding PCT Application No. PCT/EP2016/060181 dated Nov. 7, 2017.

Machine Translation and First Office Action and Search issued in connection with corresponding CN Application No. 201680026573.9 dated Sep. 4, 2018.

* cited by examiner

METHOD AND APPARATUS FOR COMPRESSOR SYSTEM PRESSURIZATION

TECHNICAL FIELD

Embodiments of the subject matter disclosed herein correspond to methods and apparatuses for pressurization of plants comprising at least two compressor systems in series.

BACKGROUND ART

In the field of pressurized plants it is usual to put a first and a second compressor systems in series, for example when high final pressures have to be reached.

The term "compressor system" means—in general—both a single compressor, for example a single-stage or multistage (more particularly centrifugal) compressor, and a plurality of compressors driven by a gas turbine and/or a steam turbine and/or a variable speed electric motor and/or fixed speed motor; typically, further to said compressors (single or multistage) in a compressor system also other components are usually provided, such for example: suction/discharge isolation valves, suction/discharge pressurization valves (more particularly in parallel with isolation valves), throttling valve, suction scrubber, centrifugal compressor, after cooler, anti-surge valve, suction/discharge check valves, anti-choke valve, hot gas bypass valve, cold gas bypass valve (in parallel with anti-surge valve), blow down valve, vent valve, relief valve.

In an embodiment, in the present description, the upstream compressor system is a multistage compressor (e.g. low-medium pressure or low-medium-high pressure) and the downstream compressor system is a single-stage compressor (e.g. high pressure or very high pressure).

Typically the two compressor systems are each one operated by a dedicated driver: for example the upstream compressor system is operated by a turbine, while the downstream one is operated by an electric motor or a gas turbine; other operating means can be—in different cases—provided without departing from the present description.

The two compressor systems are connected by a pipeline where two valves are provided in parallel: an isolation valve and a pressurization valve.

While the first valve is used when the plant is running, the second one acts for the pressurization only of the downstream compressor system.

Indeed if a problem occurs in the downstream compressor system when the plant is running, it may be necessary to depressurize it (for example up to values nearly close to the atmospheric pressure) putting it in shutdown.

In some cases, this operation is accomplished by suitably venting the downstream compressor system, while the upstream one is kept running, operating in a partial or full recycle mode.

Thus it results in a situation where the upstream compressor system is in operation and it compresses the gas to a "discharge pressure in recycle mode" (or "in loop mode") that is usually less than the "discharge pressure in operating mode", while the downstream compressor system is at a lower pressure for example equal about to the atmospheric pressure.

When the whole plant has to be restarted it is firstly necessary to pressurize again the downstream compressor system.

This is usually accomplished by opening said pressurization valve on the pipeline connecting the two compressor systems; however the opening of the pressurization valve leads to a substantially isoenthalpic expansion of the gas with a relevant temperature drop due to the Joule-Thompson effect.

In case of a gas having a high molecular weight, the Joule-Thompson effect is particularly important and it leads to a considerable temperature drop in the downstream compressor system.

For example in the "Oil & Gas" field, such plants are used for compressing gas mixtures rich in methane and other hydrocarbons up to pressures higher than 250 bar, in order to perform gas injections in gas wells or similar; particularly it can be considered (as a non-limiting example) that a gas has a relatively high molecular weight when it is equal to or higher than a value comprised between 28-44 Kmol/Kg, depending on the gas composition; it must be stressed that this range of molecular weight is not intended as limiting the invention, but only as an indication for a range in which the advantage achieved by the invention are more strongly felt.

In these cases, during the pressurization of the downstream compressor system by means of the pressurization valve, the pressure drop at the pressurization valve is very high: for example if the upstream compressor system is a low/medium pressure multistage one, such pressure drop can reach about 250 bar; this value is exceeded if the upstream compressor system is a low/medium/high pressure multistage one.

Under such hypotheses the Joule-Thompson effect leads to a temperature drop in the gas and therefore in the downstream compressor system, such to bring the latter to very low temperatures; if the minimum temperature drops below the minimum equipment design temperature, risk of mechanical integrity issues may be achieved.

With particular reference to FIG. 1 attached, the Joule-Thompson effect depends on the type of gas and on the temperature and pressure of the gas before expansion; the Joule-Thompson effect describes the temperature change of a gas when it is forced through a valve while kept insulated so that no heat is exchanged with the environment.

Experimentally is calculated as:

$$\mu_{JT} = \lim_{\Delta p \to 0} \frac{T_2 - T_1}{p_2 - p_1}$$

Where: $T_1$ is the temperature at the valve outlet, which can be measured downstream of the valve. For example, in the pipe between the valve outlet and the compressor inlet. $T_2$ is the temperature at the valve inlet, which can be measured upstream of the valve. For example in the pipe between the valve inlet and the compressor outlet. $p_1$ is the pressure at the valve outlet, which can be measured downstream of the valve. For example, in the pipe between the valve outlet and the compressor inlet. $p_2$ is the pressure at the valve inlet, which can be measured upstream of the valve.

For example in the pipe between the valve inlet and the compressor outlet. $\Delta p$ is the pressure drop across the valve, which can be measured with a dedicated pressure drop devices. $\mu_{JT}$ is the Joule-Thomson coefficient; this value is not measured but calculated. which becomes, taking into account that the process is isenthalpic:

$$\mu_{JT} = \left(\frac{\partial T}{\partial p}\right)_H$$

The equation can be put in the differential format:

$$dT = \mu_{JT} dp \text{ at } H \text{ constant}$$

The above equations show the higher is the pressure drop, the higher the temperature drop is if the Joule Thomson coefficient is greater than zero.

As an example think that with a pressure change of 250 bar (downstream and upstream of the pressurization valve) and with an output gas temperature of about 100° C. from the upstream compressor system, with a gas having a molecular weight of about 39 Kmol/kg, the downstream compressor system has a temperature of about −54° C.

Since the Joule-Thompson effect is directly proportional to the pressure drop, in the prior art, in order to reduce the temperature drop (consequence of the pressure drop when the Joule Thomson coefficient is greater than zero) in the downstream compressor system the delivery pressure of the upstream compressor system is reduced.

This is accomplished by partially or totally venting the upstream compressor system, reducing the delivery pressure thereof, thus reducing the pressure drop at the pressurization valve and therefore, finally, by mitigating the temperature decrease of the gas and accordingly of the downstream compressor system.

Although in principle this pressurization method is functional, it has some drawbacks.

Firstly a loss of production occurs, since after reducing the delivery pressure of the upstream compressor system, it has to be brought again to the working pressure, which is time consuming and it requires some additional energy.

Secondly, in some cases, it happens that the upstream compressor system has to be completely restarted, with a further time and energy waste and a reduced production.

Thirdly, environmental impacts, due to the gas emissions, could lead to penalties.

SUMMARY

Therefore there is a general need for an improved method and apparatus for Joule-Thompson effect mitigation for compressor system pressurization. An important idea is to increase the pressure of the fluid in the downstream compressor system by a discrete increase (by steps) in the pressure of the fluid supplied in the downstream compressor system, obtained by at least one bleeding of a fluid from the upstream compressor system having a pressure lower than the delivery pressure of the upstream compressor system fluid itself.

Thus the enthalpy variation of the gas that results in the Joule-Thompson effect is divided into a plurality of enthalpy variations.

This allows prior art drawbacks to be overcome, since the plant experiences a lower temperature drop: at each pressurization step the pressure and consequently the energy balance change mitigating the difference of temperature at each step.

Thus prior art drawbacks are overcome since it is possible to avoid critical low temperature at the outlet of the pressurization valve using high Molecular Weight gas at high pressure.

Moreover it is possible to improve compressor startup of the downstream compressor system by decreasing the gas density and consequently the absorbed torque, to have a constraint reduction in material selection for compressor systems and equipment, to reduce gas emission due to potential saving of flared and vented gas and to mitigate process loss of production risk.

First embodiments of the subject matter disclosed herein correspond to method of pressurizing a downstream compressor system operatively connected to an upstream compressor system by using a pipeline connected at a first end to the downstream compressor system and at a second end at least to one bleeding (or tie-out) region of the upstream compressor system.

Second embodiments of the subject matter disclosed herein correspond to an apparatus for compressor system pressurization comprising an upstream compressor system comprising on its turn a main header, a downstream compressor system comprising a supplying pipeline operatively connected to the main header of the upstream compressor system, the two compressor systems being intended to compress an operative fluid at increasing pressures and wherein the apparatus comprises at least one bleeding line comprising at least one first bleeding pipeline and a bleeding valve, wherein the bleeding line is connected to a first bleeding region of the upstream compressor system, in such first bleeding region the fluid being at a pressure lower than a pressure of the fluid in the main header of the upstream compressor system, to the supplying pipeline of the downstream compressor system.

More in general, a "bleeding region" can be considered any region, area, or portion of the upstream compressor system in which the fluid pressure is at a pressure lower than a pressure of the fluid in the main header of the upstream compressor system; in some particular (but not limiting) cases such a bleeding region is a compressor stage of the upstream compressor system.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
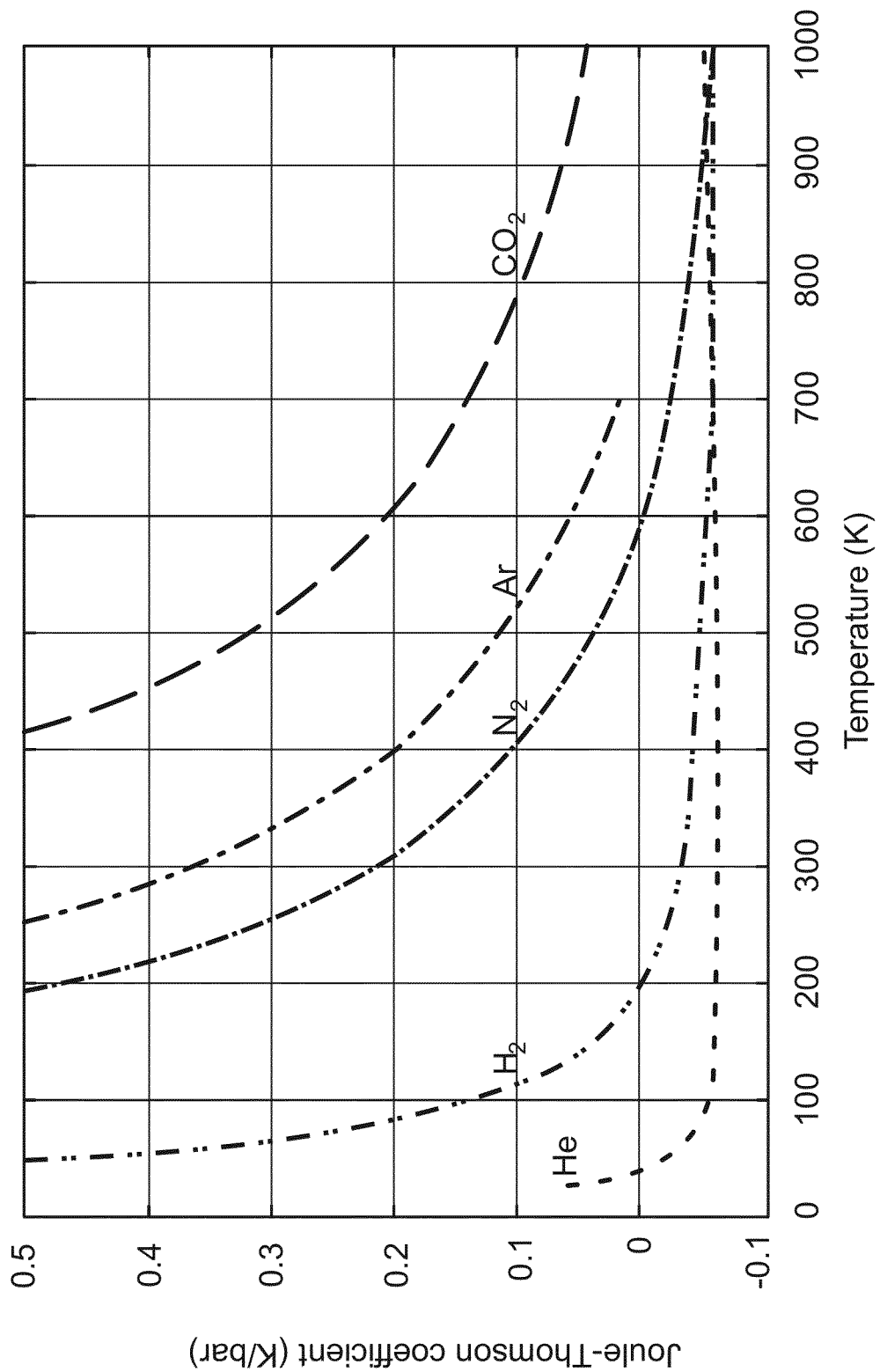
FIG. 1 shows a diagram of the Joule-Thomson coefficient variation with respect to temperature variation for different gases.
Figure 2:
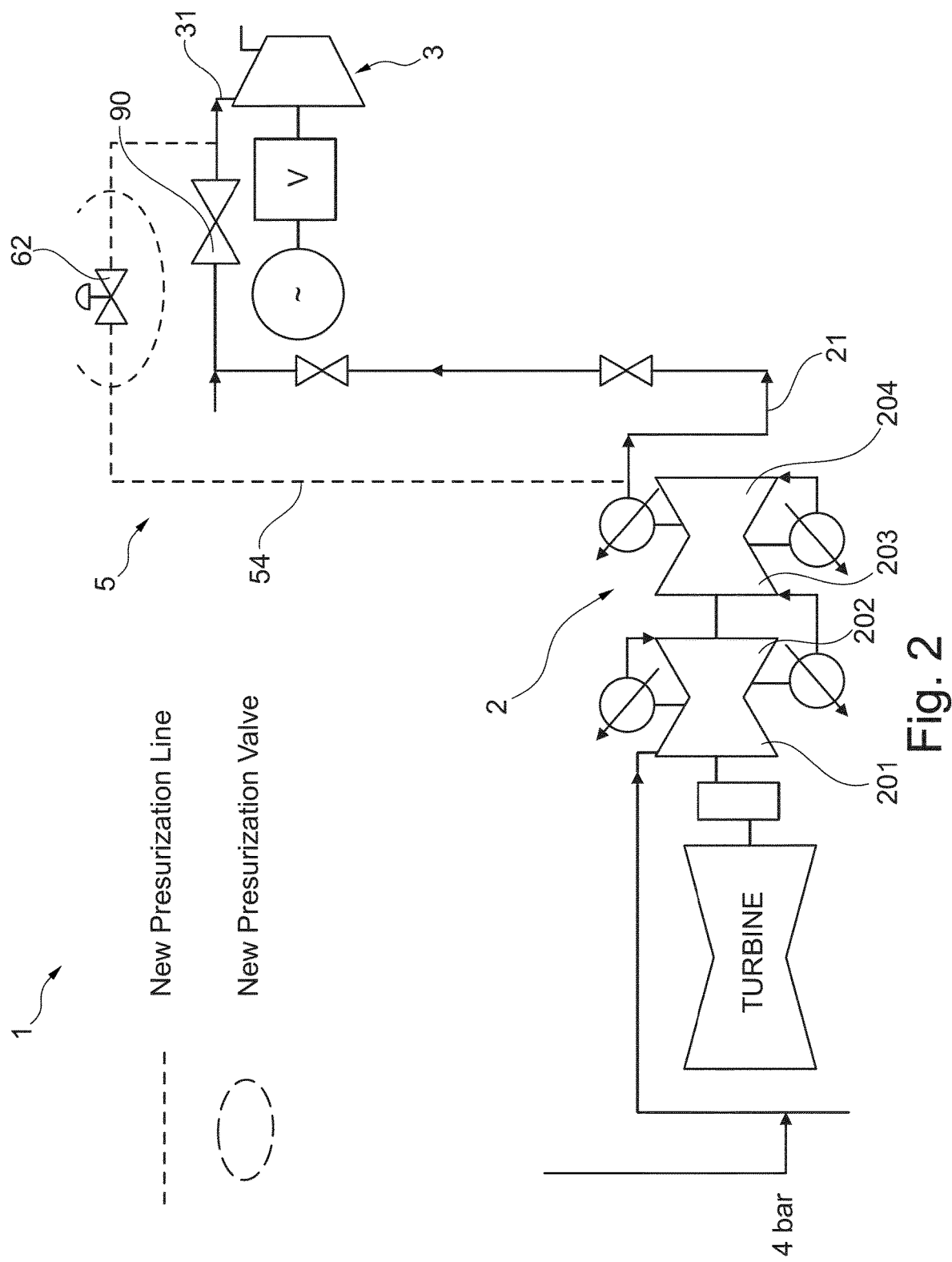
FIG. 2 shows a first embodiment of the subject matter herein described.
Figure 3:
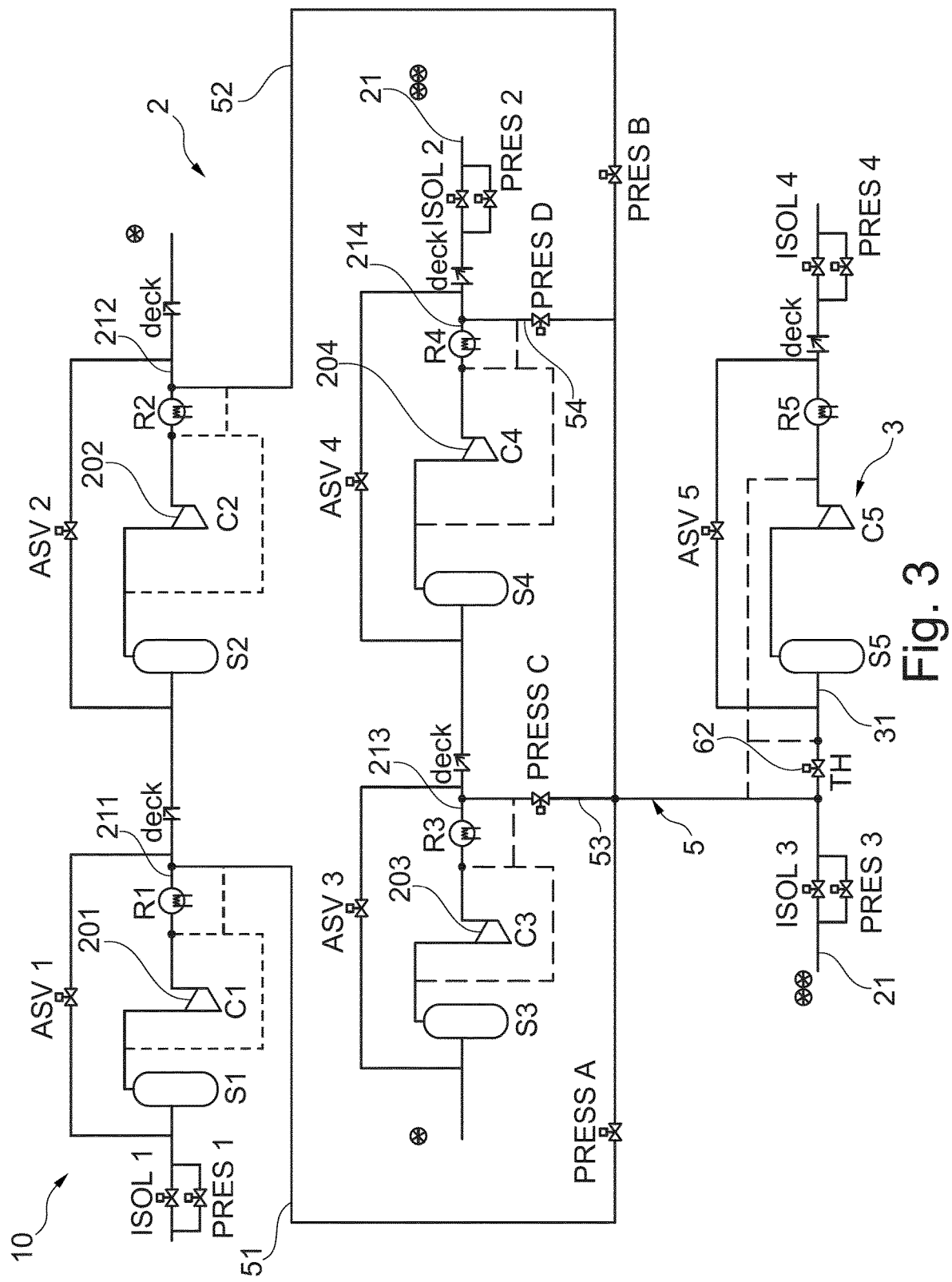
FIG. 3 shows another embodiment of the subject matter herein described.

Before describing the apparatuses 1 and 10 of FIGS. 2 and 3, it would be better to describe the method performed, although reference can be made to FIG. 2 or 3, for understanding the principle of the method herein described.

In one main embodiment, the method is adapted to pressurizing one downstream compressor system 3 operatively connected to an upstream compressor system 2 by using a bleeding line 5 connected at a first end to the downstream compressor system and at a second end at least to one bleeding region (more particularly—but not limited to—a compressor stage) or tie-out region of the upstream compressor system 2.

This pressurization takes place when the downstream compressor system has, for some reason, being depressurized, while the upstream one is kept running.

It has to be noted that the upstream compressor system is more particularly be kept running both in an operative or "standard" mode or in a full or partial recycle mode.

In these latter cases all or part the fluid that exits from the main header of the upstream compressor is again recycled in its input.

In this case (full or partial recycle mode) the "discharge pressure in recycle mode" (or "in loop mode") is usually less than the "discharge pressure in operating mode" (both being measured in the main header 21 of the upstream compressor system).

The main header 21 of the upstream compressor system 2 supplies a supplying pipeline 31 of the downstream compressors system, the two compressor systems 2, 3 being intended to compress an operative fluid at increasing pressures.

When the fluid in the downstream compressor system 3 is at a pressure lower than a pressure of the main header 21 fluid of the upstream compressor system 2, there is provided a pressurization step of the downstream compressor system 3.

It has to be noted that the downstream compressor system pressure referenced above is the pressure of the fluid measured in the supplying pipeline 31: while in normal operating condition (both compressor system 2 and 3 running) fluid pressure in the main header 21 and in the supplying pipeline 31 are substantially equal (any difference is a consequence of the pressure drop of the pipes and fittings in the header 21,31), in case that the downstream compressor system 3 is not running and is depressurized at a pressure less than the fluid pressure in the delivery pipe 21 (while the upstream compressor system 2 is running), the fluid pressure measured in the supplying pipeline 31 is less than the fluid pressure in the delivery pipeline 21, thanks to the fact that an isolation valve connecting the two pipelines 21,31 is kept closed.

According to the teaching here given, the pressurization step of the downstream compressor system 3 happens at least by supplying the supplying pipeline 31 of the downstream compressor system 3 with a fluid having a pressure higher than the fluid pressure of the downstream compressor system 3, the pressurization step providing at least one first bleeding phase, during which it is provided to bleed from the upstream compressor system 2 a first fluid at a first pressure, lower than the pressure of fluid in the main header 21 of the upstream compressor system 2 in operating condition and supply at least said fluid to the supplying pipeline 31 of the downstream compressor system 3 until reaching, in the downstream compressor system 3 fluid a pressure substantially equal to the first pressure.

Such a pressure is "substantially" equal in the sense that it would be equal less any valve pressure drop.

According to another embodiment, the pressurization step provides a plurality of bleeding phases following the first bleeding phase where each one of the plurality of bleeding phase provides to bleed from the upstream compressor system 2 a respective fluid at a respective pressure ranging from a pressure of the fluid in an immediately preceding bleeding phase to the pressure of the fluid in the delivery pipeline 21 of the upstream compressor system 2 in operating condition supply at least said fluid to the downstream compressor system 3, in an embodiment to the supplying pipeline 31 of the downstream compressor system 3, till reaching, in the downstream compressor system 3 a fluid pressure substantially equal to the respective pressure of the fluid in the actual bleeding phase (less any occurring bleed valve pressure drop).

In this way a step-by-step pressurization of the downstream compressor system 3 takes place, reducing the temperature drop in the downstream system 3 due to the Joule-Thompson effect, as above described.

With reference to FIG. 3, when the upstream compressor system 2 is provided—at least—by a train of compressors 201,202,203,204 in series with each other, said bleeding is performed, in an embodiment at least at a delivery pipeline 211,212,213,214 of each one of the compressors 201,202, 203,204 of said train of compressors.

For even better reduction in the temperature drop control, in an embodiment said bleeding is performed at each delivery pipeline 211,212,213,214 of each one of the compressors 201,202,203,204 of said train of compressors: in this way the overall pressure drop is divided in a plurality of steps; in other embodiment said bleeding is performed (alternatively or in combination with the bleeding at each delivery pipeline) before the first compressor 201 of the train, at the intake pipeline of the upstream compressor system.

With reference now to FIG. 2, a first embodiment of an apparatus 1 for compressor system pressurization is shown.

The apparatus 1 comprises an upstream compressor system 2 comprising a main header 21 and a downstream compressor system 3 comprising a supplying pipeline 31 operatively connected to the main header 21 of the upstream compressor system 2.

Connection between the main header 21 and the supplying pipeline 31 is, in an embodiment, made by means of at least one isolation valve 90, of the type known per se in the art; such valve 90 is provided between the main header 21 and the supplying pipeline 31.

The two compressor systems 2, 3 are intended to compress an operative fluid at increasing pressures, for example the upstream compressor system 2 can compress the fluid from environment pressure to low and medium pressure and the downstream compressor system 3 is adapted to compress the fluid to high pressure.

According to the teaching given here, the apparatus 1 further comprises at least one bleeding line 5 comprising at least one first bleeding pipeline 54 and a bleeding valve 62.

As can be noticed from FIG. 2, the bleeding line 5 is operatively connected to a first bleeding region (more particularly a compressor stage) of the upstream compressor system 2 and to the downstream compressor system 3, more particularly to the supplying pipeline 31 of the downstream compressor system 3.

In an embodiment, the first bleeding pipeline 54 is connected to such first bleeding region (more particularly a compressor stage) of the upstream compressor system 2 and the bleeding valve 62 is placed between the pipeline 54 and the supplying pipeline 31 as shown in the example of FIG. 2.

The bleeding valve 62 is a control or ON/OFF valve.

In the first bleeding region of the upstream compressor system 2 the fluid is at a pressure lower than a pressure of the fluid in the main header 21 of the upstream compressor system 2, during normal operating condition (systems 2 and 3 running).

In this sense, as in the non-limiting example of FIG. 2, the bleeding region of the upstream compressor system 2 can be any region (stage) of the system 2 in which the operating fluid is at such pressure; in an embodiment such bleeding region correspond to a compressor stage.

In this way a certain fluid flow can be bled from the upstream system 2 and used for raising the pressure of the downstream compressor system 3 to normal operating values, reducing the temperature drop due to the Joule-Thomson effect, as described above.

In another example, as shown in FIG. 3, the apparatus, here referenced with number 10, further comprises a plurality of additional bleeding pipelines 51,52,53,54 operatively connected to said bleeding line 5 and to a respective intermediate bleeding region (compressor stage) of the upstream compressor system 2.

Again, in each respective bleeding region (compressor stage), the fluid, in the operating condition, is bled at a pressure lower than a pressure of the fluid in the main header 21 of the upstream compressor system 2, and different from the pressure of another bleeding region.

In the given example four bleeding regions of the upstream compressor system 2 are provided, but in other embodiments a different number of them can be provided and also a different position of the tie out and tie in of the bleeding lines (for example bleeding line tie in from compression system 2 suction line and tie out from compression system 3 discharge line)

In an embodiment, as in the example of FIG. 3, the upstream compressor system 2 comprises a train of compressors 201,202,203,204 (in this case four compressors) in series with each other.

Each compressor 201,202,203,204 of said train of compressors comprises a respective delivery pipeline 211,212, 213,214: being in series, each delivery pipeline of an upstream compressor is operatively connected to a supplying pipeline of a downstream compressor, so as to compress the fluid in steps.

According to the teaching given herein, at least some of the bleeding pipelines 51,52,53,54 are—each one—in communication with a respective delivery pipeline 211,212,213, 214.

In an embodiment, as shown, all the bleeding pipelines 51,52,53,54 are each one in communication with a respective delivery pipeline 211,212,213,214.

In this way it is possible to reduce the overall complexity of the apparatus 10, while keeping the possibility to bled the fluid from respective bleeding region (compressor stage) in which the fluid is at different pressures, lower than the pressure of the fluid in the main header 21 in normal operation condition of the apparatus, so as to perform the method described above.

In an embodiment, on each bleeding pipeline 51,52,53,54 additional valves can be provided, such for example control or ON/OFF valve.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of pressurizing a downstream compressor system operatively connected to an upstream compressor system comprising:

using a bleeding line connected at a first end to the downstream compressor system and at a second end to at least one bleeding region or tie-out region of the upstream compressor system, wherein a main header of the upstream compressor system supplies a supplying pipeline of the downstream compressors system, the upstream and the downstream compressor systems configured to compress fluid at increasing pressures;

wherein when a pressure of fluid in the downstream compressor system reaches a pressure lower than a pressure of fluid at the main header of the upstream compressor system, a pressurization of the downstream compressor system occurs at least by supplying the downstream compressor system with fluid having a pressure higher than the pressure of fluid in the downstream compressor system, the pressurization further comprises bleeding an amount of fluid from the upstream compressor system, via the bleeding line, at a first pressure lower than the pressure of fluid in the main header of the upstream compressor system, and supplying bled fluid to the supplying pipeline of the downstream compressor system until a pressure of fluid in the downstream compressor system becomes substantially equal to the first pressure less any valve pressure drop.

2. An apparatus for compressor system pressurization comprising:

an upstream compressor system comprising a main header;

a downstream compressor system comprising a supplying pipeline connected to the main header of the upstream compressor system;

the two compressor systems configured to compress fluid at increasing pressures; and at least one bleeding line comprising at least one first bleeding pipeline and a bleeding valve, the bleeding line connected to (i) a first bleeding region of the upstream compressor system, wherein fluid in the first bleeding region is at a pressure lower than a pressure of fluid in the main header of the upstream compressor system, and (ii) the supplying pipeline of the downstream compressor system, wherein when a pressure of fluid in the downstream compressor system is at a pressure lower than a pressure of fluid at the main header of the upstream compressor system, a pressurization of the downstream compressor system occurs at least by supplying the downstream compressor system with fluid having a pressure higher than the pressure of fluid in the downstream compressor system, and during the pressurization, an amount of fluid is bled from the upstream compressor system, via the at least one bleeding line, at a first pressure lower than the pressure of fluid in the main header of the upstream compressor system and is supplied to the supplying pipeline of the downstream compressor system until a pressure of fluid in the downstream compressor system becomes substantially equal to the first pressure less any valve pressure drop.

* * * * *